United States Patent
Blaise et al.

(10) Patent No.: US 12,472,662 B2
(45) Date of Patent: Nov. 18, 2025

(54) METHOD FOR MANUFACTURING A HOLLOW TURBOMACHINE BLADE

(71) Applicant: SAFRAN AIRCRAFT ENGINES, Paris (FR)

(72) Inventors: Maxime Marie Désiré Blaise, Moissy-Cramayel (FR); Celia Iglesias Cano, Moissy-Cramayel (FR); Lucas Antoine Christophe Lauwick, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 135 days.

(21) Appl. No.: 18/554,151

(22) PCT Filed: Apr. 4, 2022

(86) PCT No.: PCT/FR2022/050628
§ 371 (c)(1),
(2) Date: Oct. 5, 2023

(87) PCT Pub. No.: WO2022/219263
PCT Pub. Date: Oct. 20, 2022

(65) Prior Publication Data
US 2024/0190048 A1    Jun. 13, 2024

(30) Foreign Application Priority Data
Apr. 14, 2021  (FR) ...................................... 2103851

(51) Int. Cl.
*B29C 33/48*      (2006.01)
*B29C 33/38*      (2006.01)
(Continued)

(52) U.S. Cl.
CPC .......... *B29C 33/50* (2013.01); *B29C 33/3828* (2013.01); *B29C 70/24* (2013.01); *B29C 70/48* (2013.01); *B29L 2031/08* (2013.01)

(58) Field of Classification Search
CPC ..... B29C 33/50; B29C 33/505; B29C 33/485; B29C 33/48
See application file for complete search history.

(56) References Cited

U.S. PATENT DOCUMENTS

2015/0040396 A1 *   2/2015  Fremont ............ B29D 99/0025
                                                         29/889.71
2015/0224693 A1     8/2015  Jaussaud et al.
(Continued)

FOREIGN PATENT DOCUMENTS

BE       1 018 117 A6    5/2010
WO    WO 2013/160584 A1  10/2013

OTHER PUBLICATIONS

FKM/Viton O-rings website (2020), 7 pages. (Year: 2020).*
International Search Report as issued in International Patent Application No. PCT/FR2022/050628, dated Jul. 26, 2022.

*Primary Examiner* — Matthew J Daniels
(74) *Attorney, Agent, or Firm* — Pillsbury Winthrop Shaw Pittman LLP (57) ABSTRACT

A method for manufacturing hollow composite material turbomachine part, includes producing a fibrous blank in one piece by three-dimensional weaving of yarns, the blank including at least one de-bonded zone forming an internal cavity, inserting a shaping part into the internal cavity of the fibrous blank in order to obtain a preform, densification of the preform by a matrix in order to obtain a structure having a fibrous reinforcement consisting of the preform densified by the matrix, wherein the shaping part is flexible and wherein the shaping part is mechanically withdrawn from the structure after the densification.

12 Claims, 11 Drawing Sheets

(51) Int. Cl.
  *B29C 33/50* (2006.01)
  *B29C 70/24* (2006.01)
  *B29C 70/48* (2006.01)
  *B29L 31/08* (2006.01)

(56) References Cited

U.S. PATENT DOCUMENTS

2017/0274604 A1\* 9/2017 Kobayashi .............. B32B 27/42
2020/0122363 A1\* 4/2020 Heath, III ............. B29C 33/405

\* cited by examiner

METHOD FOR MANUFACTURING A HOLLOW TURBOMACHINE BLADE

CROSS-REFERENCE TO RELATED APPLICATIONS

This application is the U.S. National Stage of PCT/FR2022/050628, filed Apr. 4, 2022, which in turn claims priority to French patent application number 21 03851 filed Apr. 14, 2021. The content of these applications are incorporated herein by reference in their entireties.

TECHNICAL FIELD

The present invention relates to the general field of hollow composite material parts, and more particularly to the vanes or stator for a gas-turbine aircraft engine of the outlet guide vane type (OGV).

PRIOR ART

In the field of aircraft engines, the turbomachine blades can be made of composite material in order to acquire a strength equivalent to or greater than that of metal, but with a lower overall mass. Indeed, the improvement in performance of the turbomachine, in particular with respect to consumption, requires a reduction in mass.

In the case of composite material blades obtained by three-dimensional weaving, the composite material located in the core of the blade only has a small influence on the mechanical performance of the part, whereas it can account for a non-negligible part of the mass of the blade. Hence, it is advantageous to manufacture hollow blades, consisting of a fibrous reinforcement obtained by three-dimensional weaving.

The fibrous structures can be draped, in a well-known manner, around a metal shaping part. The metal shaping is melted after densification of the fibrous structures. This method makes it possible to manufacture a hollow, and therefore relatively light, blade that is able to adopt various shapes. On the other hand, the process of melting the metal adds an additional step to the method, for an increased cost. In addition, the high temperatures required for this step have a non-negligible impact on the mechanical properties of the part, and in particular on its repair potential. Finally, the step of melting the shaping metal can leave undesirable residues inside the hollow blade.

In order to avoid these constraints, it is possible to use, in a known manner, a metal mandrel for draping the fibrous structures. This is mechanically withdrawn after densification of the fibrous structures. Hence, there is no additional metal melting step and a very reduced risk of leaving undesirable residues inside the part. On the other hand, the possible cavity geometries are greatly restricted by the demoulding operation. Hence, the complex shapes desired for new-generation blades are not accessible.

DISCLOSURE OF THE INVENTION

The object of the present invention is to provide a solution which makes it possible to produce hollow composite material parts, for example turbomachine blades, by overcoming the above-mentioned drawbacks.

To this end, the invention proposes a method for manufacturing a hollow composite material turbomachine part comprising at least:

producing a fibrous blank in one piece by three-dimensional weaving of yarns, said blank comprising at least one de-bonded zone forming an internal cavity, inserting a shaping part into the internal cavity of the fibrous blank in order to obtain a preform, densification of the preform by a matrix in order to obtain a structure having a fibrous reinforcement consisting of said preform densified by said matrix, the method being characterised in that the shaping part is flexible and in that the shaping part is mechanically withdrawn from the structure after the densification step.

Hence, through the use of a flexible shaping part, it is possible to produce complex shapes of cavity due to the deformability of the shaping part which will enable it to leave the cavity after the densification step. This eliminates any step of melting a metal, and hence undesirable residues or high temperatures after the densification, which could alter the mechanical performance of the part.

According to a particular feature of the invention, the shaping part comprises at least two pieces which can be separated during the withdrawal of the shaping part from the structure.

According to another particular feature of the invention, the junction between the two pieces of the shaping part is located where the cross-sectional area of the shaping part is smallest.

According to another particular feature of the invention, the junction between the two pieces of the shaping part comprises a plurality of incisions facilitating the separation of said two pieces during the withdrawal of the shaping part from the structure.

This feature makes it possible to introduce the shaping part into the fibrous blank without the two pieces of the shaping part detaching, while enabling easy separation of the two pieces at the time of demoulding. This feature can be implemented due to the properties of the material of the shaping part according to the invention, and could not have been permitted by an entirely metal shaping part.

According to another particular feature of the invention, the shaping part comprises at least one anchoring zone located on the outside of the preform during the densification step.

According to another particular feature of the invention, the shaping part is made of at least one material, the Shore A hardness of which is between 30 and 80.

According to another particular feature of the invention, the shaping part comprises a first material and a second material having different hardness, the first material being present on either side of the second material.

Here, "on either side of" shall mean that the first material is present at least on a first side of the second material and on a second side of the second material opposite the first side. Hence, the first material can frame the second material, or even completely surround the second material.

The term "materials having different hardness" shall designate materials having different hardness with respect to the same hardness scale (for example, two silicones having different Shore A hardness), or materials which cannot be compared on the same hardness scale (for example a silicone and a metal). According to another particular feature of the invention, the first material has a Shore A hardness between 30 and 60 and the second material has a Shore A hardness between 50 and 80.

The use of a more flexible material for the surface of the shaping part facilitates the demoulding of said shaping part, whereas the use of a more rigid material at the core of the shaping part facilitates the insertion of the shaping part into the fibrous blank.

According to another particular feature of the invention, the shaping part is made of silicone.

According to another particular feature of the invention, the second material is a metal.

According to another particular feature of the invention, the composite material part is a turbomachine vane.

DESCRIPTION OF THE EMBODIMENTS

The invention applies, in general, to various types of hollow composite material parts comprising a fibrous reinforcement obtained by three-dimensional weaving. The invention has an advantageous application for turbomachine blades, and in particular for the vanes or stator for gas turbine aircraft engine of the output guide vane (OGV) type.

According to a first embodiment of the invention shown in FIGS. 1 to 4, a fibrous blank 100 is produced, which is intended to form the fibrous preform of the structure of the blade.

Figure 1:
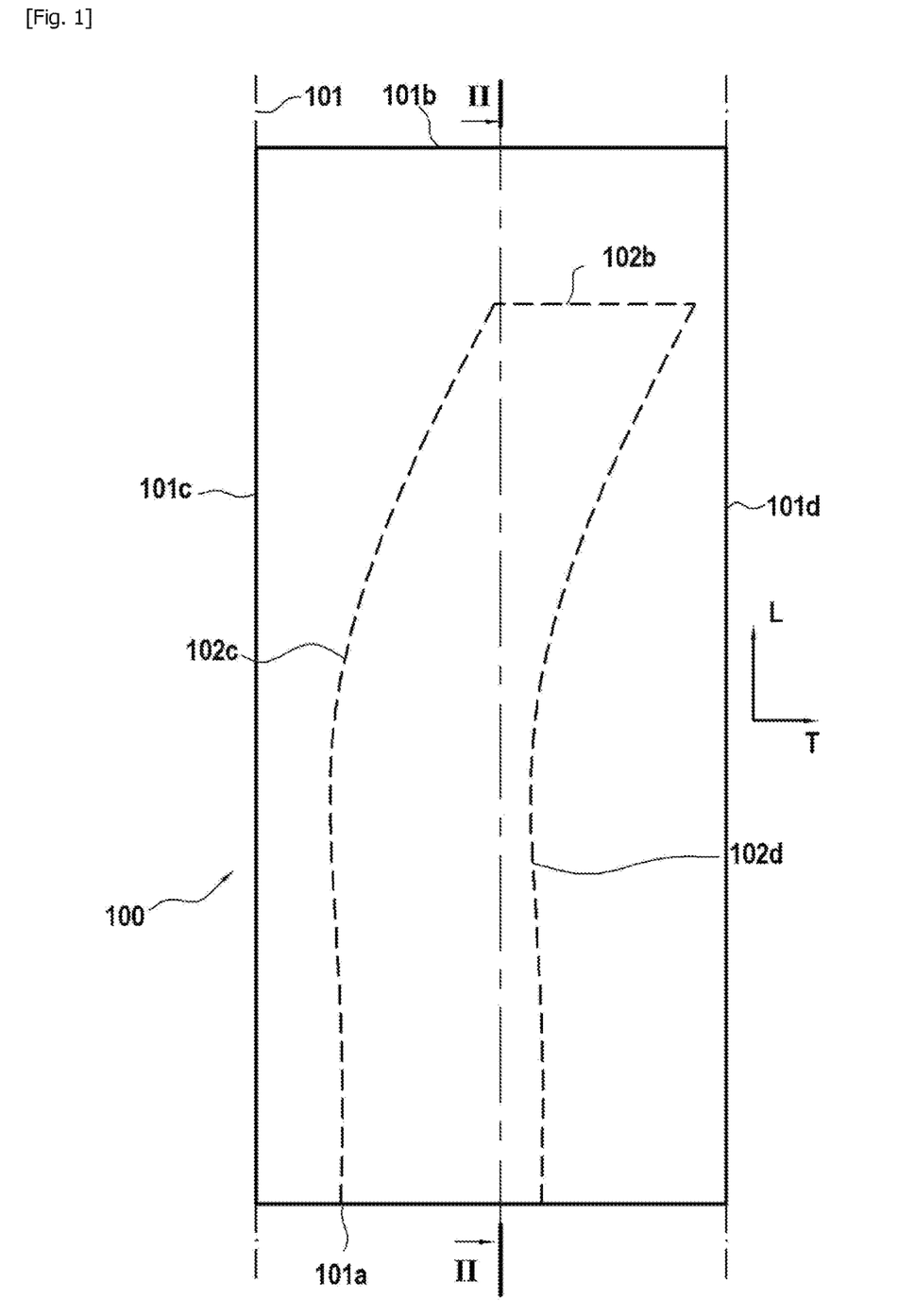
FIG. 1 is a plan view of a woven fibrous blank intended for the production of a fibrous preform, in accordance with an embodiment of the invention.
Figure 2:
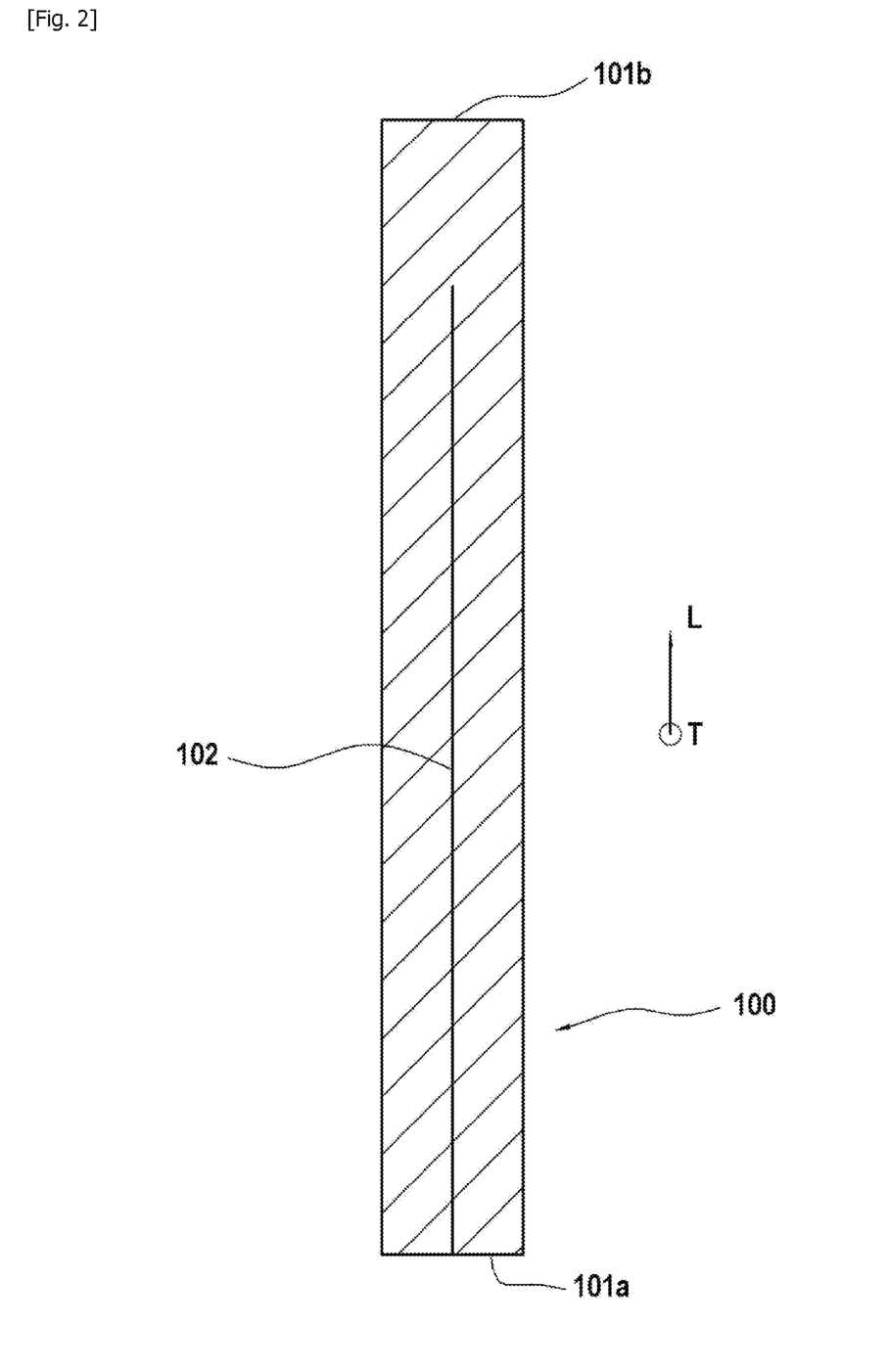
FIG. 2 is a sectional view of the fibrous blank of FIG. 1.

FIGS. 1 and 2 show a fibrous blank 100 from which a fibrous preform of the blade can be formed.

The blank 100 is obtained from a strip 101 that is woven by three-dimensional (3D) or multilayer weaving, the strip 101 generally extending in a direction L corresponding to the longitudinal direction of the blade to be manufactured. The weaving is carried out, for example, with warp yarns extending in the direction L.

A de-bonded zone 102 is formed substantially in the middle of the strip 101, over at least one part of the length of the fibrous blank 100 between the longitudinal edges 101c and 101d, between boundaries 102c and 102d. The de-bonded zone 102 must extend at least to the transverse edges 101a and 101b. In the example illustrated in FIGS. 1 and 2, the de-bonded zone extends between the transverse edge 101a and the boundary 102b. This de-bonded zone 102 makes it possible to form an internal cavity in the fibrous blank 100, intended to allow the passage of the shaping part.

Figure 3:
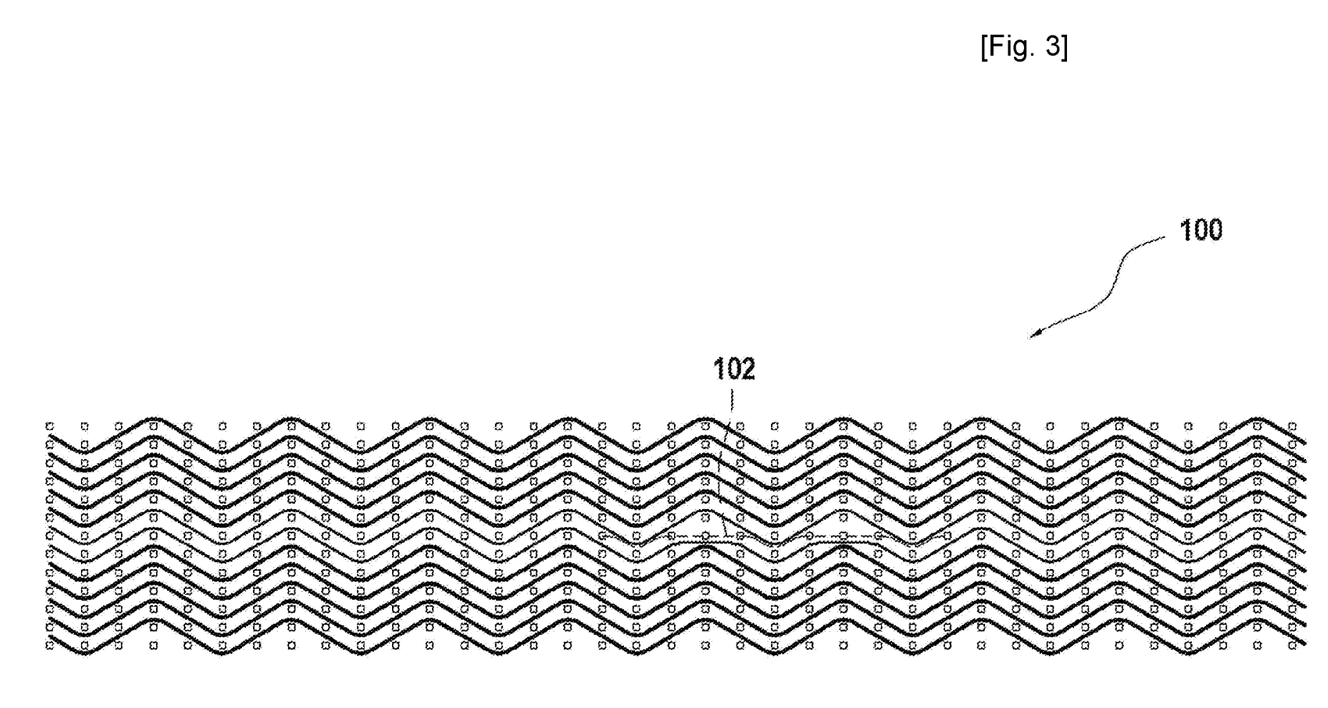
FIG. 3 is a schematic sectional view of a weaving plane of the blank of FIGS. 1 and 2.

FIG. 3 shows an example of 3D weaving with interlock weave comprising the de-bonded zone 102. Here, the term "interlock" weave means a weave in which each layer of weft yarns links a plurality of layers of warp yarns with all the yarns of the same weft column having the same movement in the weave plane.

In known manner, the de-bonded zone is arranged between two layers of warp yarns by not passing a weft yarn through the de-bonded zone during binding of the warp yarn layers located on either side of the de-bonded zone.

The fibrous blank 100 comprises a plurality of warp yarn layers (six in the example illustrated) which are bound by 3D weaving except at the de-bonded zone 102.

Outside of the de-bonded zone 102, the warp yarn layers of the blank 100 are, in the illustrated example, all bound together.

In order to weave ceramic yarns, it is possible to use, in particular, silicon carbide (SiC) yarns, for example those supplied under the name "Nicalon" by Japanese company Nippon Carbon. Other ceramic yarns can be used, in particular refractory oxide yarns, such as alumina-based yarns, $Al_2O_3$, in particular for oxide-oxide type CMC materials (fibre of the fibrous reinforcement and refractory oxide matrix). It is also possible to use carbon yarns for a CMC material with fibrous carbon reinforcement.

The fibrous strip can be treated in order to eliminate the size present on the fibres and the presence of oxide at the surface of the fibres, as known per se.

It is also known per se, that a thin layer of embrittlement-release interphase coating can then be formed on the fibres of the fibrous strip by chemical vapour infiltration (CVI). The interphase material is, for example, pyrolytic carbon PyC, boron nitride BN or boron-doped carbon BC. The thickness of the layer formed is, for example, between 10 nanometres and 100 nanometres in order to preserve the deformation capability of the fibrous blanks.

The fibrous strip is then impregnated by a consolidation composition, typically a carbon precursor resin or a ceramic precursor resin, optionally diluted in a solvent. The consolidation can be carried out in an oven.

Figure 4:
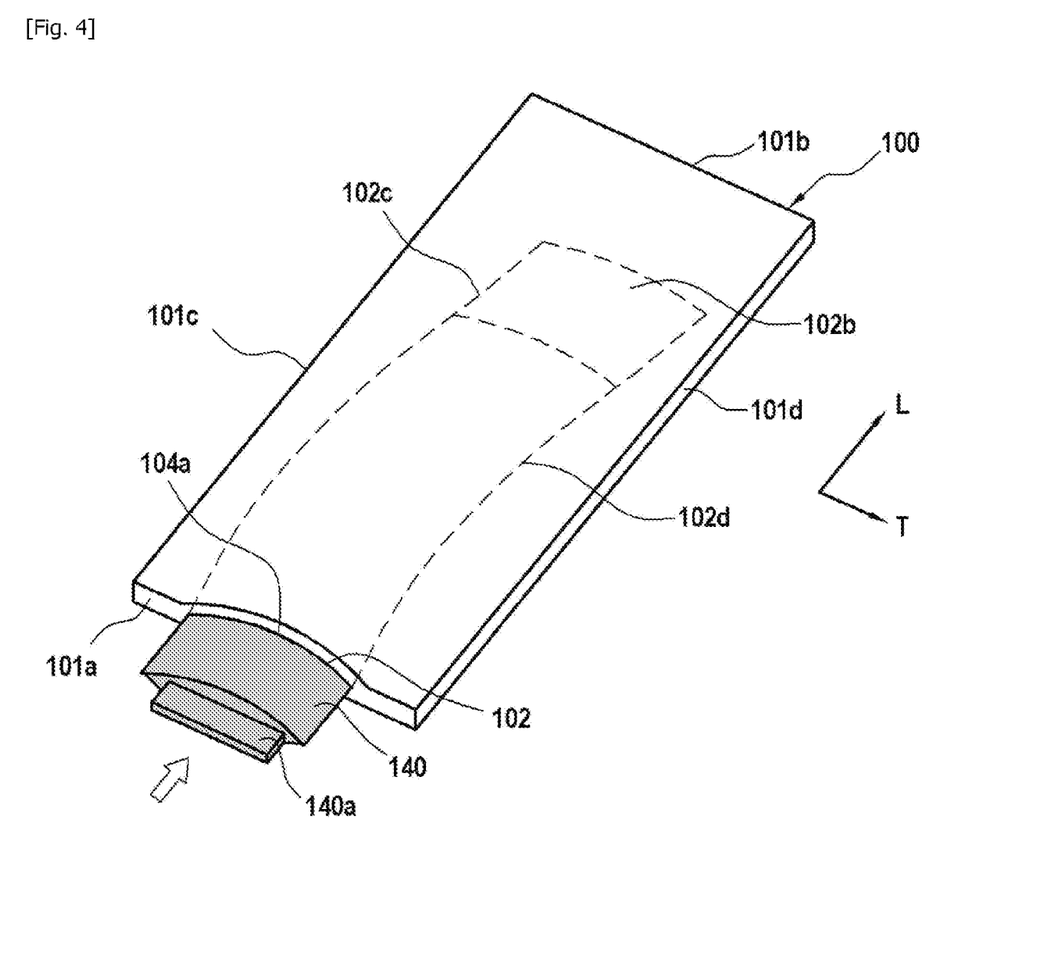
FIG. 4 is a schematic view of the insertion of a one-piece shaping part into the fibrous preform of FIGS. 1 and 2.

According to this first embodiment of the invention, the shaping of the fibrous blank 100 into a preform is carried out by introducing a flexible shaping part 140 into the blank 100 via the de-bonded zone 102, as shown in FIG. 4. It can be ensured that the fibrous blank 100 is well matched with the geometry of the shaping part 140.

The shaping part 140 has a shape corresponding to that of the cavity to be produced in the blade. Hence, the shaping part 140 can have a shape corresponding to that of the part to be produced.

The densification of the fibrous preform then takes place, by filling the pores of the preform, in all or part of the volume thereof, with the material constituting the matrix.

The matrix of the composite material constituting the structure with aerodynamic profile can be obtained in a manner that is known per se, according to the liquid method.

The liquid method involves impregnating the preform with a liquid composition containing an organic precursor of the matrix material. The organic precursor usually has the form of a polymer, such as a resin, optionally diluted in a solvent. The preform disposed around the shaping part is placed in a mould that can be sealingly closed with a recess having the shape of the final moulded piece and able, in particular, to have a twisted shape corresponding to the final shape of the structure with aerodynamic profile. The mould is then closed and the matrix precursor liquid (for example a resin) is injected into all of the recess in order to impregnate all of the fibrous part of the preform.

The transformation of the precursor into organic matrix, i.e. its polymerisation, is carried out by heat treatment, generally by heating the mould, after removal of any solvent and cross-linking of the polymer, the preform always being kept in the mould having a shape corresponding to that of the structure with aerodynamic profile. The organic matrix can, in particular, be obtained from epoxy resins, such as the high-performance epoxy resin sold under reference PR 520 by CYTEC, or from liquid precursors of carbon or ceramic matrices.

In the case of the formation of a carbon ceramic matrix, the heat treatment consists of pyrolysing the organic precursor in order to transform the organic matrix into a carbon or ceramic matrix depending on the precursor used and the pyrolysis conditions. By way of example, carbon liquid precursors can be resins with relatively high coke content, such as phenolic resins, while the ceramic liquid precursors, in particular of SiC, can be polycarbosilane (PCS) or polytitanocarbosilane (PTCS) or polysilazane (PSZ) resins. Several consecutive cycles can be carried out from the impregnation up to the heat treatment, in order to achieve the desired degree of densification.

The densification of the fibrous preform is preferably performed by the well-known method of resin transfer moulding (RTM). In accordance with the RTM method, the fibrous preform is placed around the shaping part 140 in a mould having the external shape of the desired part. The shaping part 140 can play the role of counter-mould. A thermosetting resin is injected into the internal space defined between the part made of rigid material and the mould, and which comprises the fibrous preform. A pressure gradient is generally established in this internal space between the location where the resin is injected and the orifices for removal thereof, in order to control and optimise the impregnation of the preform by the resin.

The resin used can be, for example, an epoxy resin. The resins suitable for RTM methods are well-known. They preferably have a low viscosity in order to facilitate their injection into the fibres. The choice of the temperature class and/or the chemical nature of the resin is determined as a function of the thermomechanical stresses to which the part must be subjected. Once the resin is injected into the entire reinforcement, its polymerisation proceeds by heat treatment according to the RTM method.

After the injection and polymerisation, the part is demoulded by withdrawing the flexible shaping part.

In order to facilitate the moulding and demoulding steps, or even the step of consolidating the preform in an oven, the shaping part 140 can include anchoring devices 140*a* as illustrated in FIG. 4. These anchoring devices can be used to grasp the referenced mandrel on the mould in order to position it correctly relative to the preform.

The shaping part 140 can be made of silicone. The material chosen for producing the shaping part must withstand the processing temperatures of the composite, in particular during the polymerisation step. The material must be sufficiently flexible to be withdrawn from the cavity 104*a*. Hence, the more tortuous the geometry of the cavity, the more the shaping part will need to have a certain flexibility. On the other hand, the shaping part must not be too flexible, in order to limit its absorption of the surface texture of the composite, which would generate demoulding difficulties.

Hence, the shaping part 140 can have a Shore A hardness between 30 and 80, preferably with a Shore A hardness between 50 and 80.

According to a particular embodiment of the invention, the shaping part can be produced from a plurality of materials.

For example, the shaping part may comprise one part made of a second material, framed by two pieces made of a first material on either side of the part made of second material in the transverse direction T, perpendicular to the direction L corresponding to the longitudinal direction of the blade to be manufactured (alternative not shown).

According to another example, the shaping part may comprise a first material, present at least on its surface, the first material being present around one or more cores made of the second material (alternative not shown).

The first material can have a Shore A hardness between 30 and 60, in order to obtain a sufficient flexibility of the shaping part 150 in order to facilitate its demoulding.

The second material can be a flexible material having a Shore A hardness between 50 and 80 in order to obtain sufficient rigidity of the shaping part for facilitating the insertion into the blank.

The first material and the second material can be silicones having a different Shore A hardness.

The second material can also be metallic.

The shape and location of the one or more metal cores must be adjusted in order to allow the insertion of the shaping part via the de-bonded zone, and the demoulding of said shaping part.

According to another example, the shaping part can comprise reinforcements (alternative not shown). These reinforcements can be metallic or fibrous. For example, the reinforcements can be made of glass fibre. These reinforcements allow a sufficient rigidity of the shaping part in order to facilitate the insertion into the blank. The number, location and flexibility of the reinforcements must be adjusted in order to allow the insertion of the shaping part via the de-bonded zone, and the demoulding of said shaping part.

According to a second embodiment of the invention shown in FIGS. 5 to 9, a fibrous preform 200 is produced according to a weaving method similar to the first embodiment of the invention. The blank 200 is obtained from a strip 201 that is woven by three-dimensional (3D) or multilayer weaving, the strip 201 generally extending in a direction L corresponding to the longitudinal direction of the blade to be manufactured. The weaving is carried out, for example, with warp yarns extending in the direction L.

Figure 5:
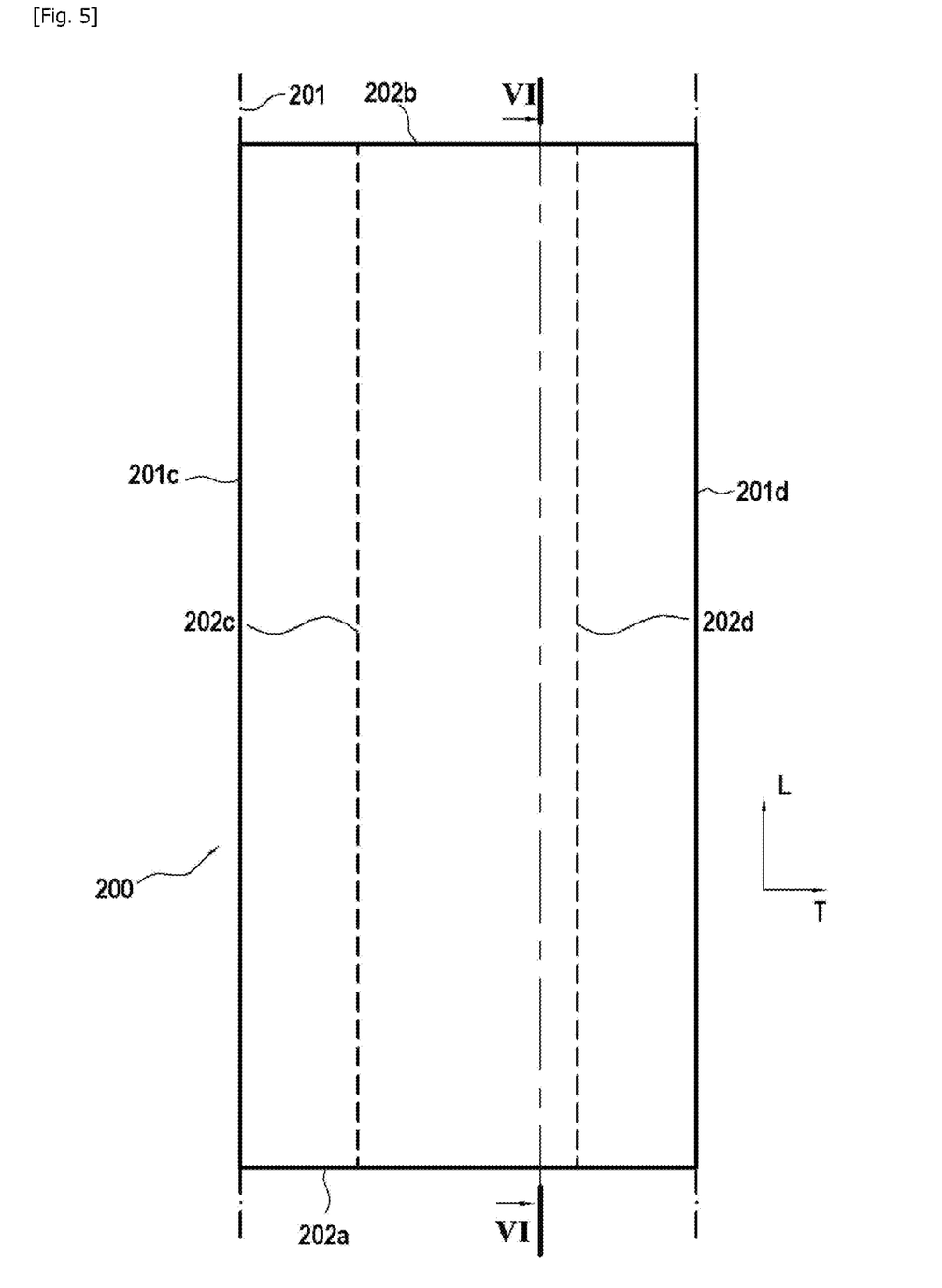
FIG. 5 is a plan view of a woven fibrous blank intended for the production of a fibrous preform, in accordance with an embodiment of the invention.
Figure 6:
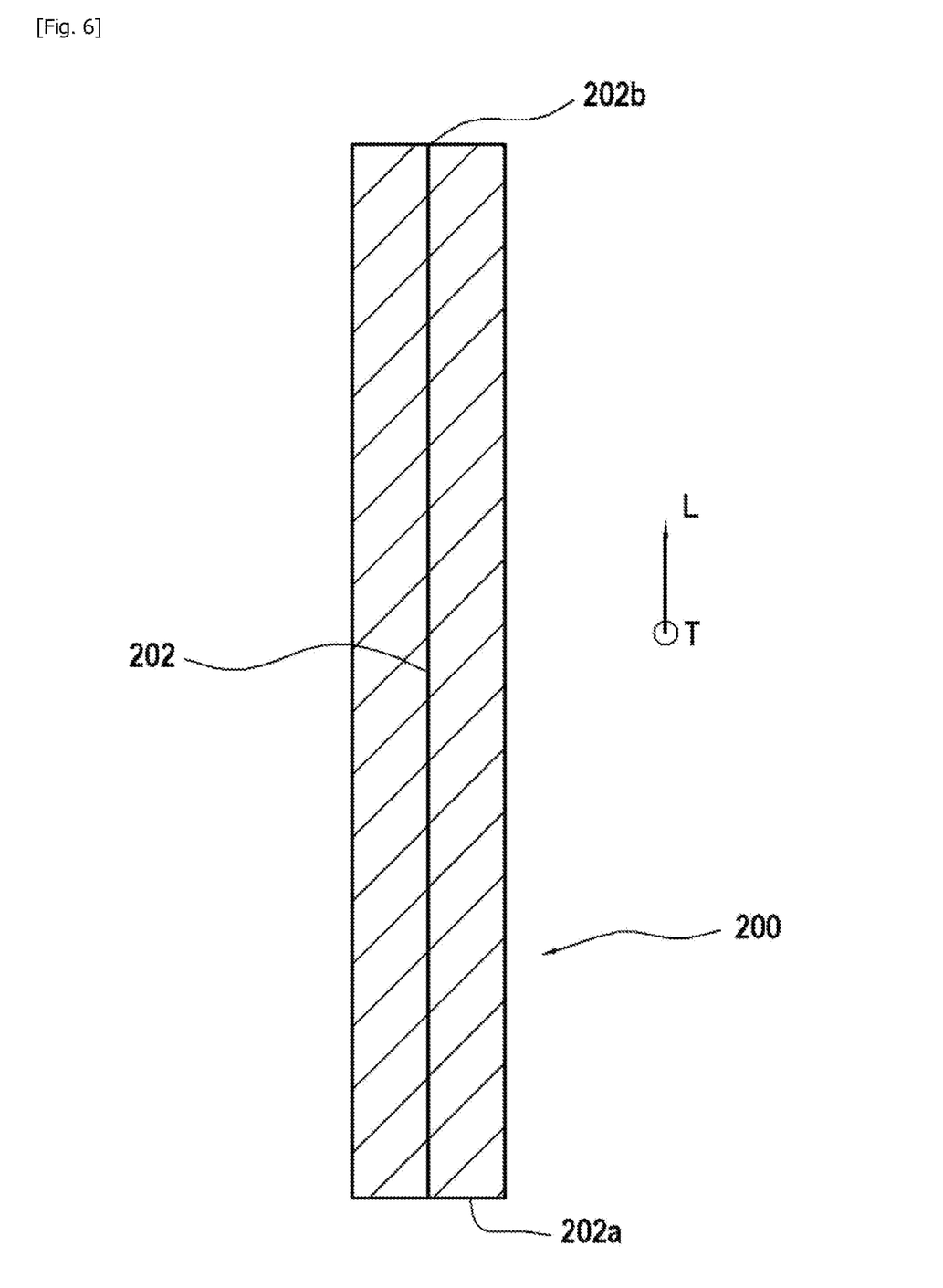
FIG. 6 is a sectional view of the fibrous blank of FIG. 5.

A de-bonded zone 202 is formed substantially in the middle of the strip 201, over all of the length of the fibrous blank 100 between the longitudinal edges 201*c* and 201*d*, between boundaries 202*c* and 202*d*. The de-bonded zone 202 extends between the transverse edges 202*a* and 202*b*. This de-bonded zone 202 is intended to allow the formation of the passage of the shaping part.

The fibrous strip can be treated in order to eliminate the size present on the fibres and the presence of oxide at the surface of the fibres, as known per se.

It is also known per se, that a thin layer of embrittlement-release interphase coating can then be formed on the fibres of the fibrous strip by chemical vapour infiltration (CVI). The interphase material is, for example, pyrolytic carbon PyC, boron nitride BN or boron-doped carbon BC. The thickness of the layer formed is, for example, between 10 nanometres and 100 nanometres in order to preserve the deformation capability of the fibrous blanks.

The fibrous strip is then impregnated by a consolidation composition, typically a carbon precursor resin or a ceramic precursor resin, optionally diluted in a solvent. The consolidation can be carried out in an oven.

Figure 7:
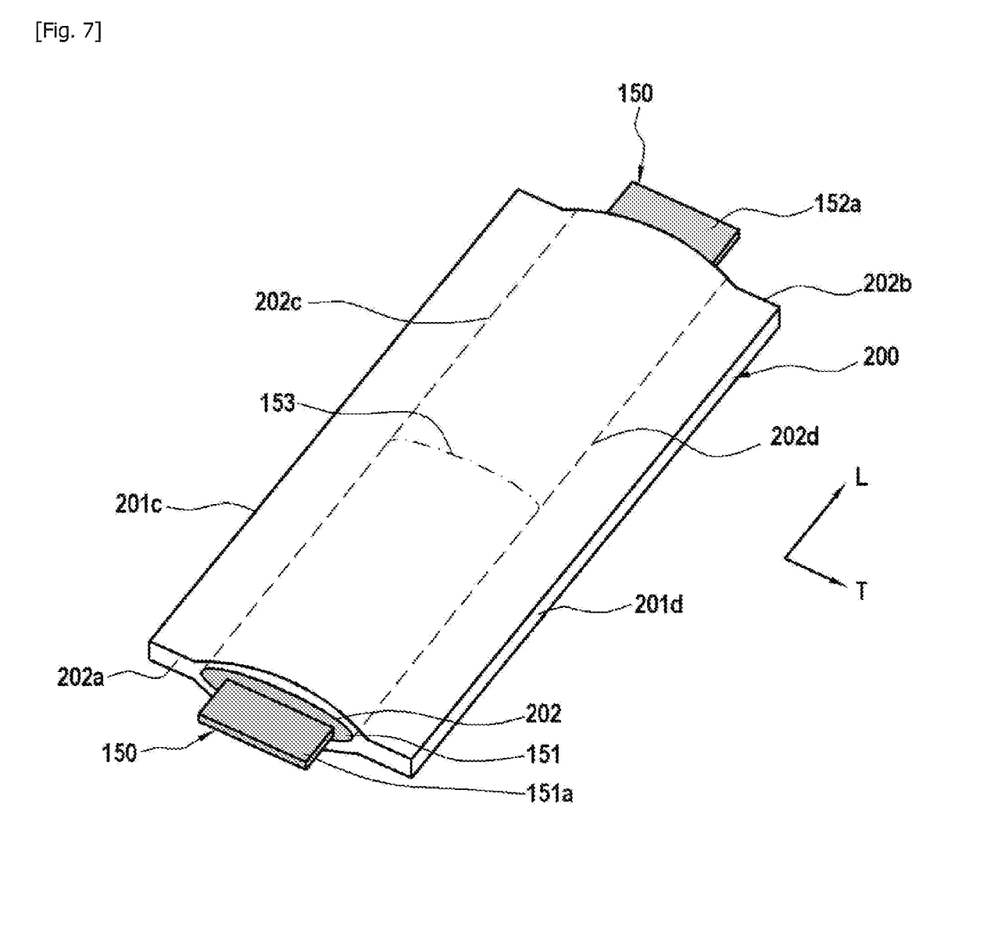
FIG. 7 is a schematic view of the insertion of a two-piece shaping part into the fibrous preform of FIGS. 5 and 6.
Figure 8:
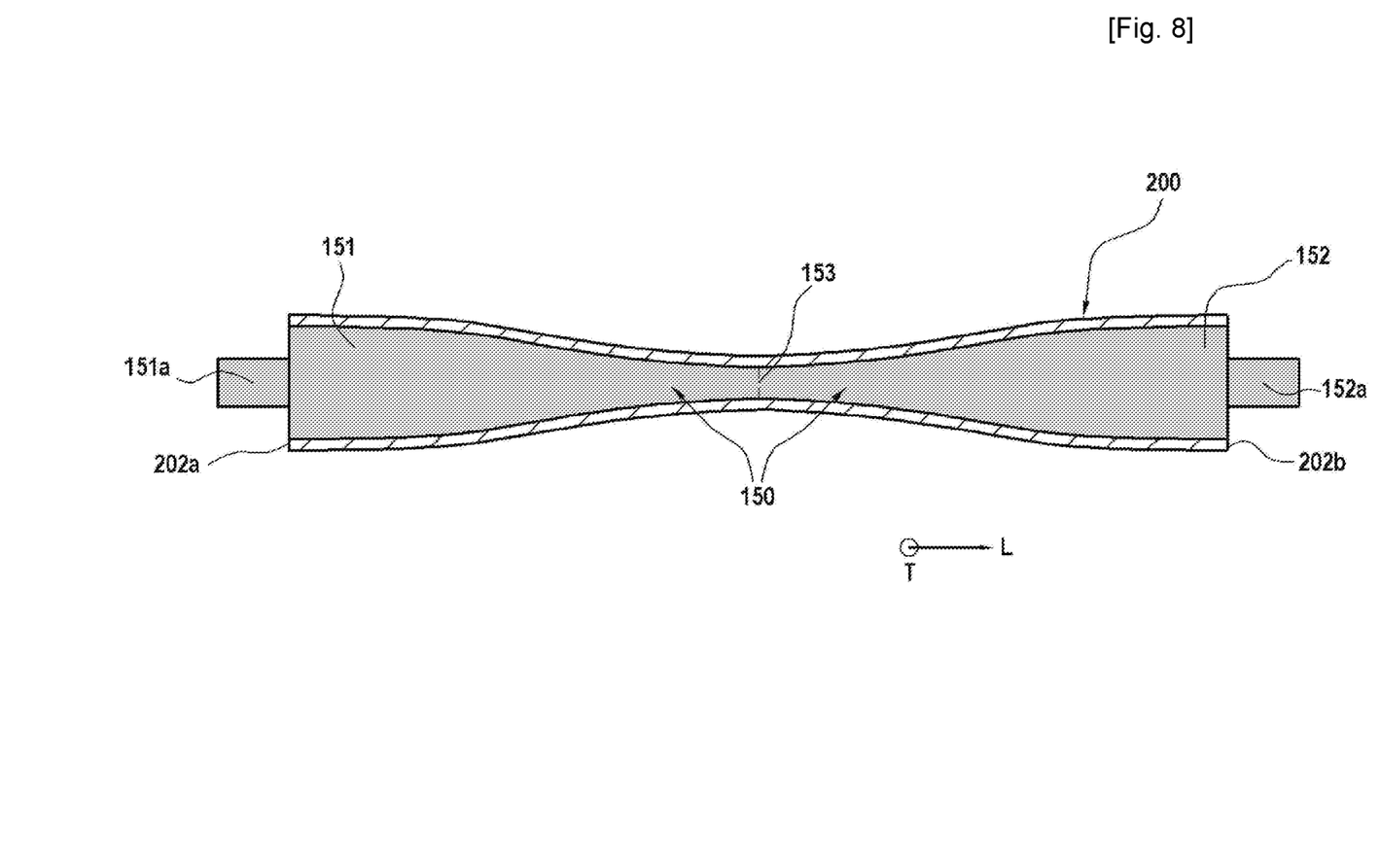
FIG. 8 is a sectional view in the direction L of the view of FIG. 7.

According to this second embodiment of the invention, the shaping of the fibrous blank 200 into a preform is carried out by introducing a flexible shaping part 150 into the blank 200 via the de-bonded zone 202, as shown in FIGS. 7 and 8. The flexibility and the deformability of the shaping part 150 facilitate its insertion into the fibrous blank 200, in particular for the insertion of pieces of greater thickness. Hence, unlike a metal shaping part, the flexible shaping part 150 enables relatively large variations in thickness.

It can be ensured that the fibrous blank 200 is well matched with the geometry of the shaping part 150. The shaping part 150 comprises, in its length in the direction L, a first piece 151 and a second piece 152, separated by a pre-cut 153. This pre-cut 153 can be produced by performing incisions along the desired line of separation between the first piece 151 and the second piece 152.

The densification of the fibrous preform then takes place, by filling the pores of the preform, in all or part of the volume thereof, with the material constituting the matrix.

The matrix of the composite material constituting the structure with aerodynamic profile can be obtained in known manner per se according to the liquid method.

The liquid method involves impregnating the preform with a liquid composition containing an organic precursor of the matrix material. The organic precursor usually has the form of a polymer, such as a resin, optionally diluted in a solvent. The preform disposed around the shaping part is placed in a mould that can be sealingly closed with a recess having the shape of the final moulded piece and able, in particular, to have a twisted shape corresponding to the final shape of the structure with aerodynamic profile. The mould is then closed and the matrix precursor liquid (for example a resin) is injected into all of the recess in order to impregnate all of the fibrous part of the preform.

The transformation of the precursor into organic matrix, i.e. its polymerisation, is carried out by heat treatment, generally by heating the mould, after removal of any solvent and cross-linking of the polymer, the preform always being kept in the mould having a shape corresponding to that of the structure with aerodynamic profile. The organic matrix can, in particular, be obtained from epoxy resins, such as the high-performance epoxy resin sold under reference PR 520 by CYTEC, or from liquid precursors of carbon or ceramic matrices.

In the case of the formation of a carbon ceramic matrix, the heat treatment consists of pyrolysing the organic precursor in order to transform the organic matrix into a carbon or ceramic matrix depending on the precursor used and the pyrolysis conditions. By way of example, carbon liquid precursors can be resins with relatively high coke content, such as phenolic resins, while the ceramic liquid precursors, in particular of SiC, can be polycarbosilane (PCS) or polytitanocarbosilane (PTCS) or polysilazane (PSZ) resins. Several consecutive cycles can be carried out from the impregnation up to the heat treatment, in order to achieve the desired degree of densification.

The densification of the fibrous preform is preferably performed by the well-known method of resin transfer moulding (RTM). In accordance with the RTM method, the fibrous preform is placed around the shaping part 140 in a mould having the external shape of the desired part. The shaping part 140 can play the role of counter-mould. A thermosetting resin is injected into the internal space defined between the part made of rigid material and the mould, and which comprises the fibrous preform. A pressure gradient is generally established in this internal space between the location where the resin is injected and the orifices for removal thereof, in order to control and optimise the impregnation of the preform by the resin.

The resin used can be, for example, an epoxy resin. The resins suitable for RTM methods are well-known. They preferably have a low viscosity in order to facilitate their injection into the fibres. The choice of the temperature class and/or the chemical nature of the resin is determined as a function of the thermomechanical stresses to which the part must be subjected. Once the resin is injected into the entire reinforcement, its polymerisation proceeds by heat treatment according to the RTM method.

Figure 9:
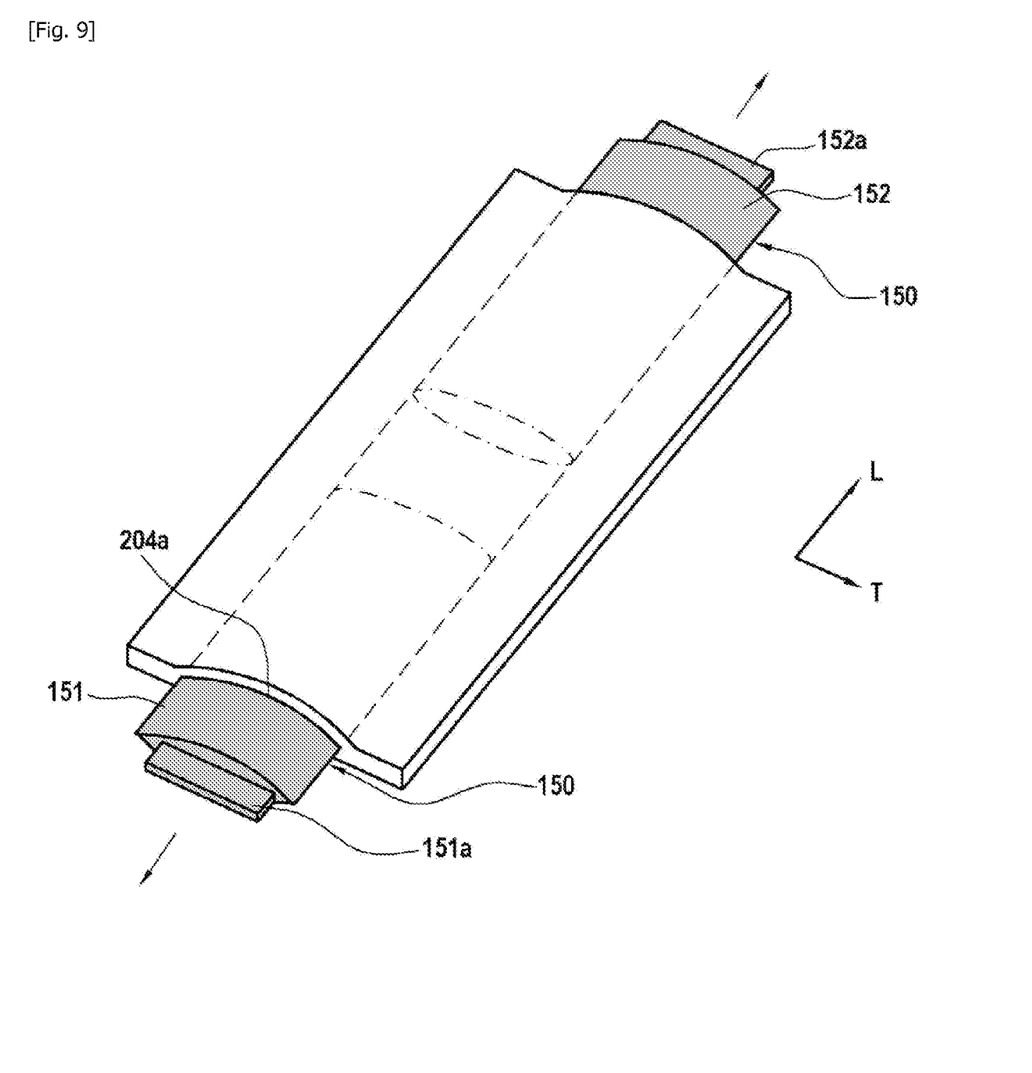
FIG. 9 is a schematic view of the demoulding of a two-piece shaping part.

After the injection and polymerisation, as illustrated in FIG. 9, the part is demoulded by pulling, on the one hand, the first piece 151 of the shaping part 150 and, on the other hand, the second piece 152 of the shaping part 150, so that the pieces 151 and 152 are separated at the pre-cut 153. The incisions made on the pre-cut 153 facilitate the separation of the two pieces 151 and 152.

The separation between the pieces 151 and 152 of the shaping part 150 reduces the friction during the demoulding of the shaping part. In addition, the location of the cut 153 can be chosen so as to coincide with the smallest cross-sectional area of the shaping part, as illustrated in FIG. 8. Hence, the method is suitable for blades with cavities of complex shape, the cross-section of which is not strictly increasing or decreasing in the direction of the length of the blade.

In order to facilitate the moulding and demoulding steps, or even the step of consolidating the preform in an oven, the shaping part 150 can include anchoring devices 151a, present on the first piece 151 of the shaping part 150, and 152a present on the second piece 152 of the shaping part 150, as illustrated in FIGS. 7 to 9. These anchoring devices can be used to grasp the referenced shaping part on the mould in order to position it correctly relative to the preform.

The shaping part 150 can be made of silicone. The material chosen for producing the shaping part must withstand the processing temperatures of the composite, in particular during the polymerisation step. The material must be sufficiently flexible to be withdrawn from the cavity 204a. Hence, the more tortuous the geometry of the cavity, the more the shaping part will need to have a certain flexibility. On the other hand, the shaping part must not be too flexible, in order to limit its absorption of the surface texture of the composite, which would generate demoulding difficulties. Hence, the shaping part 150 can have a Shore A hardness between 30 and 80.

According to a particular embodiment of the invention, the shaping part can be produced from a plurality of materials.

For example, the shaping part may comprise one part made of a second material, framed by two parts made of a first material on either side of the part made of second material in the transverse direction T, perpendicular to the direction L corresponding to the longitudinal direction of the blade to be manufactured (alternative not shown).

Figure 10:
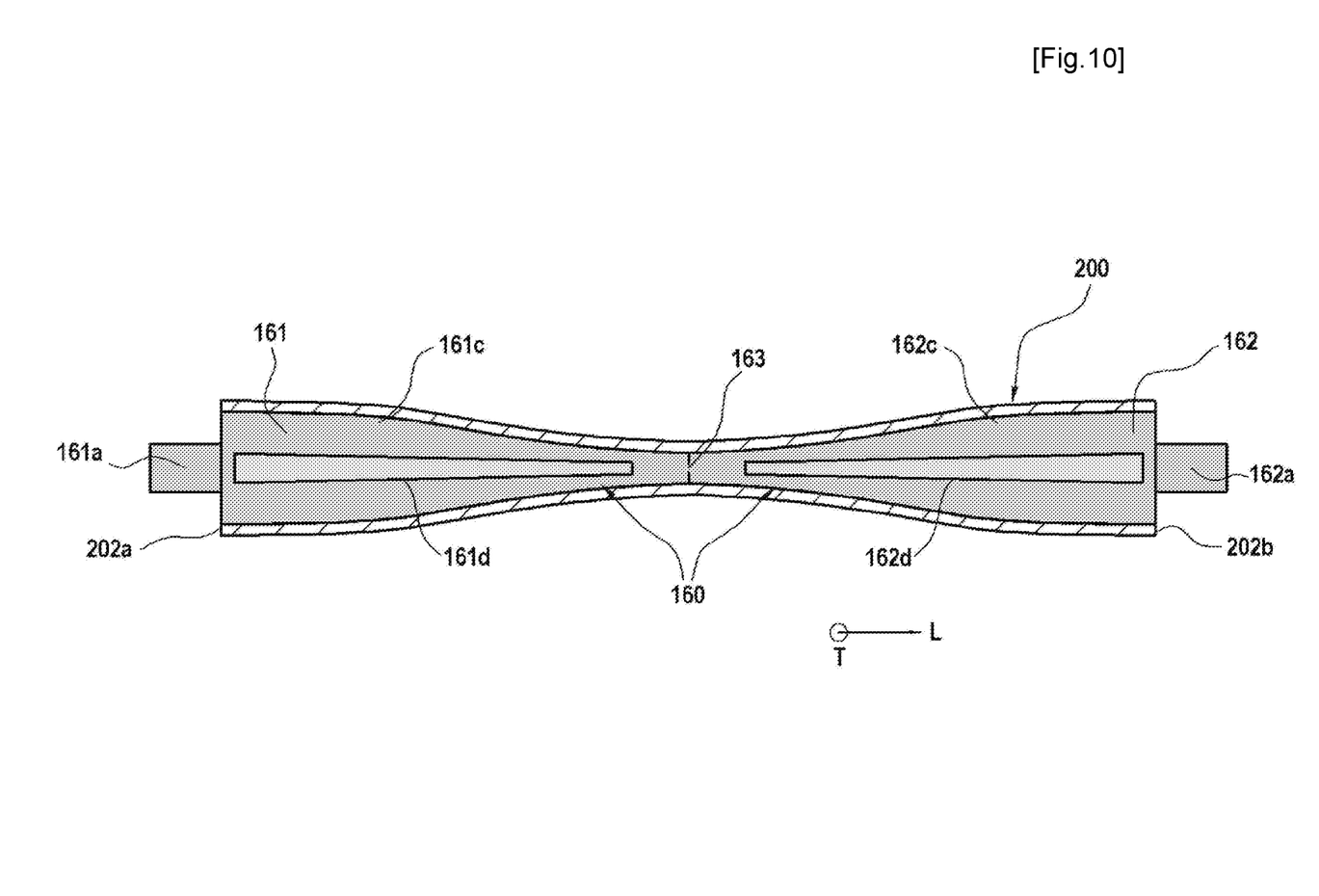
FIG. 10 is a schematic sectional view in the direction L of a two-material shaping part with cores made of second material surrounded by a first material, in accordance with an embodiment of the invention.

Another example, illustrated in FIG. 10, has a shaping part 160, comprising, in its length in the direction L, a first piece 161 and a second piece 162, separated by a pre-cut 163. This pre-cut 163 can be produced by performing incisions along the desired line of separation between the first piece 161 and the second piece 162. The shaping part 160 can include anchoring devices 161a, present on the first piece 161 of the shaping part 160, and 162a present on the second piece 162 of the shaping part 160.

The two pieces 161 and 162 of the shaping part 160 comprise a first material 161c or 162c present around a core made of second material 161d or 162d.

The cores made of second material 161d and 162d of the two pieces 161 and 162 of the shaping part may not be in contact, in order to facilitate the separation at the junction 163 at the time of demoulding.

The first material 161c or 162c can have a Shore A hardness between 30 and 60, in order to obtain a sufficient flexibility of the shaping part 160 in order to facilitate its demoulding.

The second material 161d or 162d can be a flexible material having a Shore A hardness between 50 and 80 in order to obtain a sufficient rigidity of the shaping part 160 for facilitating the insertion into the blank 200.

The first material 161c or 162c and the second material 161d or 162d can be silicones having different Shore A hardness.

The second material 161d or 162d can be a metal, the shape and location of the one or more metal cores must be adjusted in order to allow the insertion of the shaping part via the de-bonded zone, and the demoulding of said shaping part.

Figure 11:
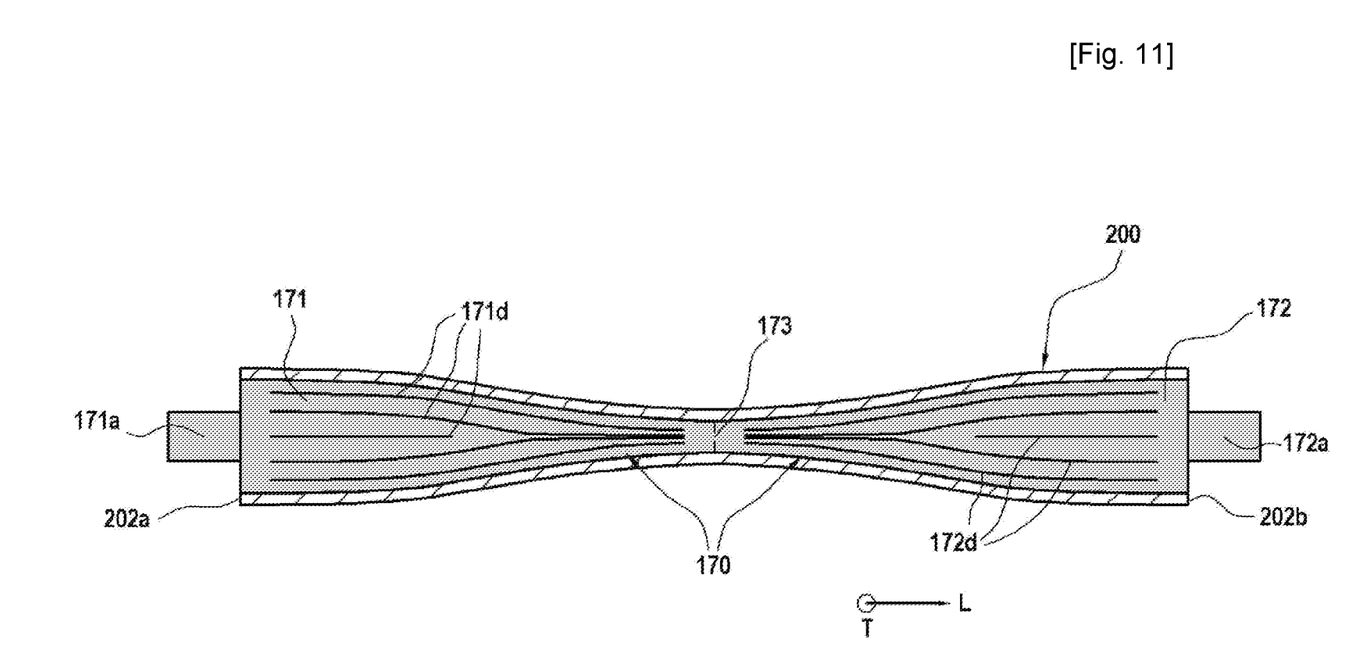
FIG. 11 is a schematic sectional view in the direction L of a two-material shaping part comprising reinforcements, in accordance with an embodiment of the invention.

Another shaping part example comprising a plurality of materials is illustrated in FIG. 11, which shows a shaping part 170 comprising reinforcements 171d and 172d. The shaping part 170 comprises, in its length in the direction L, a first piece 171 and a second piece 172, separated by a pre-cut 173. This pre-cut 173 can be produced by performing incisions along the desired line of separation between the first piece 171 and the second piece 172. The shaping part 170 can include anchoring devices 171a, present on the first piece 171 of the shaping part 170, and 172a present on the second piece 172 of the shaping part 170.

The reinforcements 171d and 172d can be discontinuous at the junction 173 between the two pieces 171 and 172, in order to facilitate the separation at the junction 163 at the time of demoulding.

The reinforcements 171d and 172d can be metallic or fibrous. For example, the reinforcements 171d and 172d can be made of glass fibre. The reinforcements 171d and 172d allow a sufficient rigidity of the shaping part 160 to be obtained in order to facilitate the insertion into the blank 200. The number, location and flexibility of the reinforcements must be adjusted in order to allow the insertion of the shaping part via the de-bonded zone, and the demoulding of said shaping part.

In the example shown in FIGS. 1 to 4, the boundaries 102c and 102d of the de-bonded zone 102 are not rectilinear and the thickness of the shaping part 140 is constant in the direction L. By contrast, in FIGS. 5 to 9, the boundaries 202c and 202d of the de-bonded zone 202 are rectilinear and the thickness of the shaping parts 150, 160 and 170 varies in the direction L. It is of course not departing from the scope of the invention if the boundaries of the de-bonded zone are not rectilinear and the thickness of the shaping part varies in the direction L; a configuration in which the invention also has an advantageous application.

The expression "between . . . and . . . " should be understood to include the limits.

The invention claimed is:

1. A method for manufacturing a turbomachine hollow composite material part, comprising:
producing a fibrous blank in one piece by three-dimensional weaving of yarns, said fibrous blank comprising at least one de-bonded zone forming an internal cavity,
inserting a shaping part into the internal cavity of the fibrous blank in order to obtain a preform, and
densification of the preform by a matrix in order to obtain a structure having a fibrous reinforcement consisting of said preform densified by said matrix,
mechanically withdrawing the shaping part from the structure after the densification step,
wherein the shaping part is flexible and comprises a first material which has a Shore A hardness between 30 and 80 and a second material having different hardness, the first material being present on either side of the second material, and
wherein the first material completely surrounds the second material and the second material is more rigid than the first material.

2. The method according to claim 1, wherein the shaping part comprises at least two pieces which are separable during the withdrawal of the shaping part from the structure.

3. The method according to claim 2, wherein a junction between the two pieces of the shaping part is located where a cross-sectional area of the shaping part is smallest.

4. The method according to claim 2, wherein a junction between the two pieces of the shaping part comprises a plurality of incisions facilitating separation of said two pieces during the withdrawal of the shaping part from the structure.

5. The method according to claim 1, wherein the shaping part comprises at least one anchoring zone located on an outside of the preform during the densification step.

6. The method of claim 5, wherein the at least one anchoring zone is made of the first material.

7. The method according to claim 1, wherein the first material has a Shore A hardness between 30 and 60 and the second material has a Shore A hardness between 50 and 80.

8. The method according to claim 1, wherein the shaping part is made of silicone.

9. The method according to claim 1, wherein the second material is a metal.

10. The method according to claim 1, wherein the composite material part is a turbomachine vane.

11. The method of claim 1, wherein the second material comprises at least two separate and spaced-apart elements embedded within the first material, and wherein the first material continuously surrounds and connects the spaced-apart elements to form a unitary shaping part.

12. The method of claim 1, wherein a distribution of the second material within the first material varies along a longitudinal direction of the shaping part such that a spacing or cross-sectional arrangement of the second material elements changes along a length of the shaping part.

* * * * *